ized Patent [19]

United States Patent [19]
Hart

[11] 3,755,244
[45] Aug. 28, 1973

[54] POLYOLEFIN PIGMENT DISPERSIONS
[75] Inventor: William J. Hart, Glens Falls, N.Y.
[73] Assignee: Hercules Incorporated, Wilmington, Del.
[22] Filed: June 2, 1971
[21] Appl. No.: 149,365

Related U.S. Application Data
[63] Continuation-in-part of Ser. No. 818,435, April 22, 1969, abandoned.

[52] U.S. Cl..... 260/41 R, 106/308 N, 260/33.6 PQ, 260/34.2, 260/37 N, 260/37 PC, 260/41 B, 260/41 C, 260/41.5 R, 264/117
[51] Int. Cl..... C08f 45/04, C08f 45/08, C08f 45/14
[58] Field of Search.................. 260/41 R, 34.2; 106/308 N; 264/117

[56] References Cited
UNITED STATES PATENTS
3,360,497  12/1967  Jones et al............................ 260/41
3,462,390  8/1969  Dunn..................................... 260/41

*Primary Examiner*—Morris Liebman
*Assistant Examiner*—H. H. Fletcher
*Attorney*—Charles L. Board

[57] ABSTRACT

Non-dusting, granular pigment concentrates which are intimate dispersions of pigment in a low molecular weight polyolefin are described. The pigment dispersions are produced by milling pigment, low molecular weight polyolefin and water to form an aqueous slurry and then solvent granulating the pigment dispersion in the slurry in the presence of a surfactant.

9 Claims, No Drawings

POLYOLEFIN PIGMENT DISPERSIONS

This application is a continuation-in-part of my co-pending application Ser. No. 818,435, filed Apr. 22, 1969, and now abandoned.

This invention relates to the production of granular pigment dispersions suitable for the coloring of solid plastics.

In the practical production of pigment dispersions the major problem has been how to achieve good dispersion without prolonged and expensive mechanical working. This problem has been particularly troublesome when working with plastics and particularly the polyolefins because the plastics are poor wetting vehicles for pigments and do not have sufficient melt viscosity to develop suitable shear rates. One method which has been pro-posed to avoid the dry grinding difficulties has been to mill the pigment and plastic in a specific liquid grinding medium containing water and a water-miscible organic liquid which is at least a partial solvent for the plastic and is present in an amount sufficient to attack the plastic and make it receptive to the entrance and dispersion of the pigment. Although this process gives good dispersions, the requirement that relatively large amounts of organic solvents must be used detracts considerably from any advantages achieved thereby. Moreover, the milled product, when pulverized for use, is a dusty, soft product which requires careful handling. Another method which has been proposed involves preparing an aqueous dispersion of the pigment in the presence of a fairly large amount of a dispersing agent, transferring the pigment by means of an organic solution into a low molecular weight polyolefin in the presence of a high molecular weight polyolefin, extruding the pigmented plastic mass and then pelletizing. By and large this method provides excellent dispersion and high quality product. However, there are practical limits to the pigment concentration which can be achieved and the product, because it contains a comixture of low molecular weight and high molecular weight polyolefin is not readily compatible with many plastic materials.

Now, in accordance with the present invention it has been found that good quality pigment dispersions can be easily produced in a granular, free flowing form by: milling pigment and low molecular weight polyolefin in water to form an aqueous slurry; granulating the pigment dispersion in the slurry in the presence of a water-immiscible organic liquid which is at least a partial solvent for the polyolefin, and a surfactant; and then recovering the granulated pigment dispersion. In a preferred process, the granulation step is carried out by adding a water-immiscible organic liquid which is at least a partial solvent for the polyolefin and a cationic surfactant to the slurry, heating the mixture so formed to a temperature ranging from about 30° C. to about 100° C., adjusting the pH of the mixture to at least about 6 or above, and then continuing heating until granulation is complete and at least part of the solvent is removed by steam distillation.

The recovered pigment dispersion is a granular, generally spherical, free-flowing, dry, non-dusting color concentrate which is ideally suited for incorporation into a mass of the same material or a wide variety of different plastic materials to give a uniformly colored plastic which can be extruded or molded into fibers, filaments, films and other applications requiring pigment dispersion of a high degree, or useful for paints, printing inks and other products. Typical plastic materials which can be colored with the pigment dispersions of the invention include the low and high density polyolefins and particularly polyethylene and polypropylene, the polycarbonates, the polystyrenes, the acrylonitrile-butadiene-styrene type resins, the synthetic rubbers, polyamides, vinyl polymers such as poly(vinyl chloride), poly(vinylidene chloride) and copolymers of vinyl chloride and vinyl acetate, and the like.

Having described the invention generally, the following examples are given to illustrate specific embodiments of the invention. All parts and percentages are by weight unless otherwise indicated.

EXAMPLE 1

500 Parts of a pigment type, medium color channel black having a particle size of about 20 millimicrons, 450 parts of powdered polyethylene having a molecular weight of about 1,500, a density of 0.91, an average particle size of 0.2 mm. and a melting point of 102° C. and 3,000 parts of water were charged to a pebble mill which was approximately half-filled with 1/2 inch flint pebbles. The charge was ground for 20 hours, after which time part of the charge was dumped, 25 parts of a cationic surfactant, 1-(2-hydroxyethyl)-2-n-heptadecenyl-2-imidazoline acetate was added to the mill and the remainder of the charge dumped.

The milled charge was added to an agitated stainless steel tank equipped with steam heating means and containing sufficient water to give a solids content of about 18 percent. Next, 350 parts of mineral spirits (boiling point range: 120° to 150° C.) and 25 parts of the above cationic surfactant were added and the slurry heated to 88° C. under agitation. Then seven parts of a 50 percent solution of sodium hydroxide was added to adjust the pH to 9.5 to 10.0 and heating continued slowly to 98° C. When most of the solvent was steam distilled, cooling water was added to reduce the temperature to 60° C. and harden the granules. The batch was then run out onto a screen where the bulk of the water was separated from it. The partly dewatered material was thoroughly washed with water to remove extraneous salts and then dried at 93° C. The product was a finely-divided granular dispersion containing about 50 percent carbon black based on the weight of the product. It was non-dusting when handled in blending equipment conventional for the incorporation of colorants in plastics.

EXAMPLE 2

The procedure of Example 1 was repeated except that 650 parts of a pigment grade furnace black having a particle size of 27 millimicrons was substituted for the 500 parts of the channel black of Example 1 and 300 parts of the polyethylene were used. The product was a fine granular dispersion containing 65 percent of carbon black.

Portions of the product of this example were let down with various amounts of nylon and converted into molding powder and compared with nylon molding powder pigmented to the same level with raw pigment. In all instances, much more jet black plastics were obtained when the product of this invention was used instead of the raw furnace black pigment.

Further portions of the product of this example were blended in a Banbury mixer with powdered poly(vinyl chloride) and with a powdered copolymer of acrylonitrile, butadiene and styrene in an amount to give a two percent pigmentation level. In each case complete dispersion was obtained with a minimum cycle time.

EXAMPLES 3 and 4

The procedure of Example 1 was repeated except that in these examples the mill charge was 2,400 parts of a presscake (20 percent pigment solids) of phthalocyanine blue (Example 3) or quinacridone violet (Example 4), 280 parts of the polyethylene and 1,300 parts of water. The products of these examples were finely divided, non-dusting granular dispersions and contained 60 percent pigment.

EXAMPLE 5

1,700 Parts of rutile titanium dioxide, 260 parts of the polyethylene of Example 1, 40 parts of 1-(2-hydroxyethyl)-2-n-heptadecenyl-2-imidazoline and 3,000 parts of water were charged to a pebble mill which was approximately half-filled with 1/2 inch flint pebbles. The charge was ground for 20 hours, after which time the resulting flocculated slurry was dumped into a stainless steel tank equipped with an agitator and steam heating means and sufficient water added to give a solids content of 25 percent. Next 260 parts of mineral spirits were added and the tank contents heated to 50° C. with agitation, at which temperature, heating was discontinued and the pH was adjusted to about 8.5 with sodium hydroxide. Heating was then continued to raise the temperature to 60° C. in approximately 15 minutes and the contents held at 60° C. for another 15 minutes to complete granulation, after which time cooling water was added to reduce the temperature to 40° C. and harden the granules. The batch was then run out onto a screen where the bulk of the water was separated from it. The partly dewatered material was thoroughly washed with water to remove extraneous salts and the washed product dried at 93° C. The product was a finely divided, non-dusting, granular dispersion containing 85 percent titanium dioxide.

EXAMPLE 6

The procedure of Example 2 was repeated except that in this example the cationic surfactant was the acetate salt of dehydroabietylamine and the pH was adjusted to 7.5 to 8.0. The pigment dispersion so produced contained 65 percent of furnace black and was comparable to that of Example 2.

EXAMPLE 7

The procedure of Example 2 was repeated except that in this example the polyethylene had a molecular weight of about 3,500, a density of 0.93 and a melting point of 116° C. The pigment dispersion contained 65% furnace black and was comparable to that of Examples 2 and 6.

As illustrated by the above examples, the process of this invention provides excellent pigment dispersions in a free-flowing, granular and non-dusting form. If desired for certain applications, the granules can be pulverized to a fine powder, either before or after drying, as for example, in a hammer mill.

The process of the invention, as stated, involves the following three steps: (a) milling pigment, low molecular weight polyolefin and water to form an aqueous slurry, (b) granulating the pigment dispersion in the slurry in the presence of a water-immiscible organic liquid which is at least a partial solvent for the polyolefin, and a surfactant; and then (c) recovering the granular product.

The low molecular weight polyolefins utilized herein are polyolefins scuh as polyethylene and polypropylene and/or mixtures of polyolefins having average molecular weights from about 1,000 to about 30,000. In general these materials are characterized by relatively low melting points, i.e., from about 100° to about 125° C., or higher, and by a high degree of solubility in organic solvents at temperatures at or below 100° C. These low molecular weight polyolefins are well known and will usually have a particle size less than about 2 mm. and preferably from about 0.05 to about 0.5 mm.

Pigments which can be dispersed in accordance with this invention are any of the solid colorants normally used in the industry for the coloring, opacifying, delustering or otherwise modifying the color of plastics. These include the inorganic and organic prime pigments, extender pigments, metallic pigments, the various finely-divided channel and furnace blacks and the like. The pigment can be dry or in presscake form. Presscakes are preferred where possible as these avoid the aggregation that normally occurs during drying of the pigment. Typical pigments include organic pigments such as benzidine yellow, the phthalocyanine blues and greens, the quinacridone reds and violets, dioxazine violet and the like; and inorganic pigments such as the cadmium reds and yellows, the cadmium sulfide type pigments, the molybdate oranges, iron oxide yellow and red, and the like. Also suitable are the hydrophilic type pigments such as, for example, titanium dioxide and the lead chromate colors. Because these pigments are more resistant to incorporation into the polyolefin during milling, it is usually desirable to add a small amount, as, for example, of the order of about one to two percent of an oil-soluble surfactant to the milling stage to transform the pigment to the more hydrophobic form.

As stated above, the pigment is first milled with low molecular weight polyolefin in the presence of water which is the grinding medium. In practice, the pigment to polyolefin ratio will vary within relatively large limits depending of course upon the degree of pigmentation desired, the particular pigment used and the oil absorption value of the pigment. Usually, the pigment to polyolefin ratio will range from a ratio of about 85:15 with pigments having low oil absorption values such as titanium dioxide, to a ratio of about 30:70 with pigments having high oil absorption values such as the very jet shades of carbon black. The amount of water present as the grinding medium will of course vary with the pigment, and in all instances should be sufficient to give a fluidity to the mixture which permits effective milling action. Usually, the solids content will be from about 15 percent to about 40 percent at this stage. Milling can be carried out in a pebble mill, paddle-stirred ball mill or any apparatus designed to produce grinding by impact.

After milling is complete, usually in from 4 to 40 hours, the charge is withdrawn and transferred to a granulation tank fitted with an agitator and suitable heating means. If desired, withdrawal of the charge and transfer from the mill to the tank can be facilitated by adding a small amount of surfactant to reduce the surface tension of the charge and reduce foaming. The addition of surfactant during the transfer, however, is not necessary to the practice of the invention. Water is usually used to facilitate transfer of the milled charge to the agitated tank and additional water can be added at this point, to further dilute the charge and/or give adequate fluidity for agitation. A solids concentration of from one to 40 percent will usually be sufficient to provide adequate fluidity. However, in practice, a solids concentration of about 15 to 25 percent is preferred.

The charge is next solvent granulated in the presence of a surfactant. Granulation is preferably carried out by adding the water-immiscible organic liquid which is at least a partial solvent for the polyolefin to the aqueous slurry containing the surfactant and heating the mixture to within the range of from about 30° to 100° C. to complete granulation.

The organic solvent utilized can be any water-immiscible organic liquid which is at least a partial solvent for unpigmented low molecular weight polyolefin. Preferred are the aliphatic and aromatic hydrocarbons and the halogenated hydrocarbons. Typical of such solvents are the liquid olefins, benzene, the xylenes, varnish makers and painters naphtha, kerosene, mineral spirits, monochlorobenzene, perchloroethylene, trichloroethylene, tetrachloroethane, carbon-tetrachloride, and the like. Particularly preferred are the hydrocarbon solvents having a boiling point range of 120° to 150° C. and a flash point greater than 10° C. The amount of solvent added should, of course, be sufficient to granulate the pigment dispersion from the aqueous phase. Although a large excess is not harmful, from the standpoint of economy, however, the amount of solvent will usually range from about 0.2 to 3.0 parts of solvent per part of polyethylene.

As previously stated, a surfactant is present at this stage to facilitate and control granulation. The surfactant is usually added along with the solvent but can be added at any earlier point, as during grinding and/or transfer. By the term surfactant as used herein is meant an agent which modifes the properties of a liquid medium at a surface or interface, usually by reducing surface tension or interfacial tension. The presence of a surfactant is believed to be essential to the successful solvent granulation of the pigment dispersions and the achievement of the advantages of the invention. Although the reasons for this are not completely understood, it is believed that the surfactant plays several roles, e.g., that of wetting agent to increase fluidity of the milled charge and that of an emulsifying agent for the solvated polyolefin. Thus, granulation control is represented by the successful coalescence of the pigmented polyolefin particles in a solvated state to form a somewhat coarse but uniform emulsion. In general, any anionic, cationic or non-ionic surfactant which is heat stable at plastic processing temperatures and is capable of being converted to a water-insoluble, oil-soluble surfactant is suitable for use herein. Particularly preferred are the cationic surfactants. Thus, any heat stable amine, including primary, secondary and tertiary amines can be used herein. Tertiary amines properly substituted to fill the above requirements are very satisfactory. Typical of the substituted tertairy amines are the heterocyclic tertiary amines such as the alkyl imidazolines and oxazolines. Other substituted tertiary amines which can be used are polyethoxylated amines having the following structural formula:

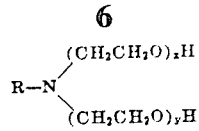

where R is an organic radical, i.e., a fatty acid radical containing from about 12 to about 20 carbon atoms, and $x$ and $y$ are integers whose sum may vary from 2 to about 6 or 7 as long as the free base is water-insoluble.

Preferred compounds of this type for use herein are the heterocyclic tertiary amines. These amines exhibit excellent wetting power and solubility in hydrocarbon solvents, have good heat stability and low water solubility. They are capable of forming water-soluble salts with various acids. The acetate salts of these materials are excellent surfactants. The chain length of
The above compound is characterized by its water insolubility, and excellent solubility in most common organic solvents.

Anionic surfactants which have sufficient heat stability for subsequent plastic processing, and which can be converted to a water-insoluble, oil-soluble form are also suitable. Typical anionic surfactants include sodium oleate, sodium laurate, sodium palmitate, sodium stearate, sodium naphthenate, sulfonated castor oil, sulfonated petroleum, sulfonated tall oil and the like. Also acceptable are anionic surfactants such as Tergitol 4 (the sodium sulfate derivative of 7-ethyl-2-methyl-4-undecanol), Igepon AC-78 (the coconut oil acid ester of sodium isethionate) and Aerosol 22 (tetrasdium-N-(1,2-dicarboxyethyl)-N-octadodecyl sulfosuccin-imate). the substituted alkyl group is critical only as it affects the water solubility of the free base and effectiveness of the salt as wetting agent. In general, alkyl chain lengths from about seven carbon atoms to about 19 carbon atoms are operative, the limiting factors being the water solubility of the free base in the shorter chain lengths and the water insolubility of the salts with resultant reduced effectiveness as surfactants in the longer chain lengths beyond 19 carbon atoms. Preferred length of the alkyl chain is from about 11 to about 17 carbon atoms.

One of the preferred imidazolines is 1-(2-hydroxyethyl)-2-n-heptadecenyl-2-imidazoline.

A suitable primary amine for use herein is dehydroabietylamine which has the following structural formula:

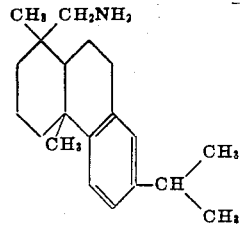

The above compound is characterized by its water insolubility, and excellent solubility in most common organic solvents.

Anionic surfactants which have sufficient heat stability for subsequent plastic processing, and which can be converted to a water-insoluble, oil-soluble form are also suitable. Typical anionic surfactants include sodium oleate, sodium laurate, sodium palmitate, sodium stearate, sodium naphthenate, sulfonated castor oil, sulfonated petroleum, sulfonated tall oil and the like.

Also acceptable are anionic surfactants such as Tergitol 4 (the sodium sulfate derivative of 7-ethyl-2-methyl-4-undecanol), Igepon AC-78 (the coconut oil acid ester of sodium isethionate) and Aerosol 22 (tetrasodium-N-(1,2-dicarboxyethyl)-N-octadodecyl sulfosuccin-imate).

In addition to the use of cationic or anionic surfactants alone or in combination as a salt or soap complex, it is possible to use nonionic surfactants as wetting agents and/or emulsifying agents for granulation control. A wide variety of nonionic surfactants are known to be effective stabilizers for emulsions of the oil-in-water type and are suitable for use in the present invention. Particularly useful are the non-foaming surfactants and preferably the alkylphenoxy polyoxyethanols such as Triton X-100, either alone or in combination with an amine type surfactant such as an imidazoline.

The choice and amount of surfactant will, of course, vary depending upon a number of factors which include the type of pigment, the HLB value of the surfactant and the particular solvent. Generally, the amount of surfactant will depend upon the type of pigment of its surface area. Usually, inorganic pigments such as cadmium sulfide yellow or titanium dioxide white which have average particle sizes within the range of from about 0.1 micron to about 2.0 microns require from about 0.1 percent to about four percent surfactant. On the other hand, organic pigments which have a much higher surface require larger proportions of surfactant. Organic pigments such as phthalocyanine blue, carbon black, quinacridone violet and the like having average particle sizes in the range of from about 0.05 micron to 0.5 micron usually require from about three percent to about 15 percent surfactant. Also, within the above ranges it is possible and oftentimes desirable to use a combination of surfactants selected to provide specific properties. For example, a combination of ionic and nonionic surfactants can be used and the specific surfactants of the combination selected on the basis of solubility so as to provide retention in the final granular composition or removal prior to recovery of the granules.

The pH of the mixture at this point is usually adjusted to about 6 or above and preferably to 7 to 8 when a primary amine such as dehydroabietylamine is used or to 9.5 to 10.5 when a tertiary amine such as an alkyl imidazoline is used. Although any alkaline material can be used for this purpose, sodium hydroxide is preferred. Other alkalies such as potassium hydroxide, ammonium hydroxide, sodium carbonate, potassium carbonate and water-soluble bases such as the water-soluble alkylamines or alkanolamines or morpholine are suitable. Likewise, any anionic material which will chemically react with the water soluble form of the cationic surfactant to produce a heat stable, water-insoluble and oil-soluble compound can be used. Those skilled in the art will recognize that the role of the surfactants may be reversed and that it may be desirable and practical to have the anionic surfactant present initially and effect precipitation with one of the amine forms described above.

Heating is preferably, although not necessarily, continued to steam distill at least a part of the organic solvent from the mixture so that the granules will be firm enough to be transported to separatory means for removing the bulk of the water. After dewatering, the granules are washed and dried in conventional manner.

For example, dewatering can be carried out by running the cooled batch through any type of conventional filtering apparatus such as a filter press, screen, etc. The partially dewatered granules can then be washed with fresh water to remove residual salts. Drying can be accomplished by conventional means such as tray driers, vacuum driers, etc.

An important advantage of the granular pigment dispersions of this invention over the prior art products is the non-dusting property of the granules. This property permits the plastic processor to handle the colored concentrate in air conveying systems, hoppers and blenders with a minimum of clean up and without concern for contamination with adjacent systems. Another important property is the granular form of the pigment. The granular dispersions of this invention will usually range in particle size from about 0.1 to about 5 millimeters and preferably from about 0.5 to about 2 millimeters. The latter range is particularly preferred because it permits uniform and easy blending of the pigment dispersion with either powdered or pelleted plastics.

What I claim and desire to protect by Letters Patent is:

1. A process for preparing a granular dispersion of pigment in a low molecular weight polyolefin selected from the group consisting of polyethylene, polypropylene, mixtures of polyethylenes, mixtures of polypropylenes, and mixtures of polyethylene and polypropylene, said polyolefin having an average molecular weight within the range of about 1,000 to about 30,000, which process comprises
    a. forming an aqueous slurry of pigment dispersed in said polyolefin by milling pigment, said polyolefin in the form of particles having a size less than about 2 mm. and water in an amount to provide sufficient fluidity for effective milling, said pigment and polyolefin being present in a weight ratio ranging from about 85:15 to about 30:70;
    b. granulating the pigment dispersion in the slurry in the presence of a water-immisicible organic solvent for the polyolefin, and a heat stable surfactant which is capable of being converted to a water-insoluble oil-soluble form, said surfactant being present in an amount ranging from about 0.1 percent to about 4 percent by weight of the pigment when the pigment is inorganic and from about three percent to about 15 percent by weight of the pigment when the pigment is organic; and then
    c. recovering the granulated pigment dispersion.

2. The process of claim 1 wherein the granulating step (b) is carried out at a temperature ranging from about 30° to about 100°C.

3. The process of claim 1 wherein the polyolefin is polyethylene.

4. The process of claim 1 wherein the granulation step (b) comprises the sequential steps of
    1. adding a water-immiscible organic solvent for the polyolefin and a cationic surfactant to the aqueous slurry,
    2. heating the mixture so formed to a temperature ranging from about 30° C. to about 100° C.,
    3. adjusting the pH of the mixture to at least about 6 or above, and then
    4. continuing heating until granulation is complete and at least part of the solvent is removed by steam distillation.

5. The process of claim 4 wherein the polyolefin is polyethylene.

6. The process of claim 3 wherein the pigment is carbon black.

7. The process of claim 3 wherein the pigment is phthalocyanine blue.

8. The process of claim 3 wherein the pigment is titanium dioxide.

9. The process of claim 5 wherein the pigment is carbon black.

* * * * *

PO-1050
(5/69)

UNITED STATES PATENT OFFICE
CERTIFICATE OF CORRECTION

Patent No. 3,755,244  Dated  August 28, 1973

Inventor(s) William J. Hart (Case X-2)

It is certified that error appears in the above-identified patent and that said Letters Patent are hereby corrected as shown below:

Column 6, line 16 in printed patent after "of" insert
--the substituted alkyl group is critical only as it affects the water solubility of the free base and effectiveness of the salt as wetting agent. In general, alkyl chain lengths from about 7 carbon atoms to about 19 carbon atoms are operative, the limiting factors being the water solubility of the free base in the shorter chain lengths and the water insolubility of the salts with resultant reduced effectiveness as surfactants in the longer chain lengths beyond 19 carbon atoms. Preferred length of the alkyl chain is from about 11 to about 17 carbon atoms.

Column 6, line 17 through line 42 of printed patent should be deleted entirely

Column 7, line 22 of printed patent, "of" third occurrence should read --and--

Signed and sealed this 8th day of January 1974.

(SEAL)
Attest:

EDWARD M. FLETCHER, JR.
Attesting Officer

RENE D. TEGTMEYER
Acting Commissioner of Patents